US005771305A

United States Patent [19]

Davis

[11] Patent Number: 5,771,305

[45] Date of Patent: Jun. 23, 1998

[54] REMOVABLE BAG FOR MOUNTING OF STEREO SYSTEM ON TWO-WHEELED VEHICLE

[75] Inventor: Robert A. Davis, 917 East St., Lemont, Ill. 60439

[73] Assignees: Robert A. Davis; Dawn L. Davis, both of Lemont, Ill.

[21] Appl. No.: 673,801

[22] Filed: Jun. 27, 1996

[51] Int. Cl.[6] .................................................... H04R 25/00

[52] U.S. Cl. ...................... 381/188; 280/288.2; 280/834; 180/219; 297/411.1

[58] Field of Search .................................... 455/344, 345, 455/346, 350, 351; 381/24, 86, 188; 224/413, 418, 420; 297/411.1; 180/90, 219; 312/7.1; 280/288.2, 834

[56] References Cited

U.S. PATENT DOCUMENTS

| | | | |
|---|---|---|---|
| 4,436,350 | 3/1984 | Jolin | 312/7.1 |
| 4,445,228 | 4/1984 | Bruni | 455/345 |
| 4,662,547 | 5/1987 | Villaneuva et al. | 224/30 |
| 4,754,901 | 7/1988 | Villaneuva et al. | 224/30 |
| 4,756,454 | 7/1988 | Villaneuva et al. | 224/30 |
| 5,001,779 | 3/1991 | Eggert et al. | 455/346 |
| 5,159,712 | 10/1992 | Schneider et al. | 455/344 |

OTHER PUBLICATIONS

Mortorcycle Audio for the Harley Davidson, J & M Corporation, 1996.

*Primary Examiner*—Curtis Kuntz
*Assistant Examiner*—Rexford N. Barnie
*Attorney, Agent, or Firm*—Jefferson Perkins

[57] ABSTRACT

A bag having three compartments, one each for a left speaker, a right speaker and a main unit, is adapted to be releasably mounted to the handlebars of a motorcycle or the like. The bag is provided with stiffening wings to better affix the stereo system to the motorcycle and to resist buffeting by the wind, and grommeted holes for internal wiring.

10 Claims, 3 Drawing Sheets

10
13a
14
13b
13c
12
18
28
20
30
48
56a
24
46
44
54
42
50
40
32
36
26
16

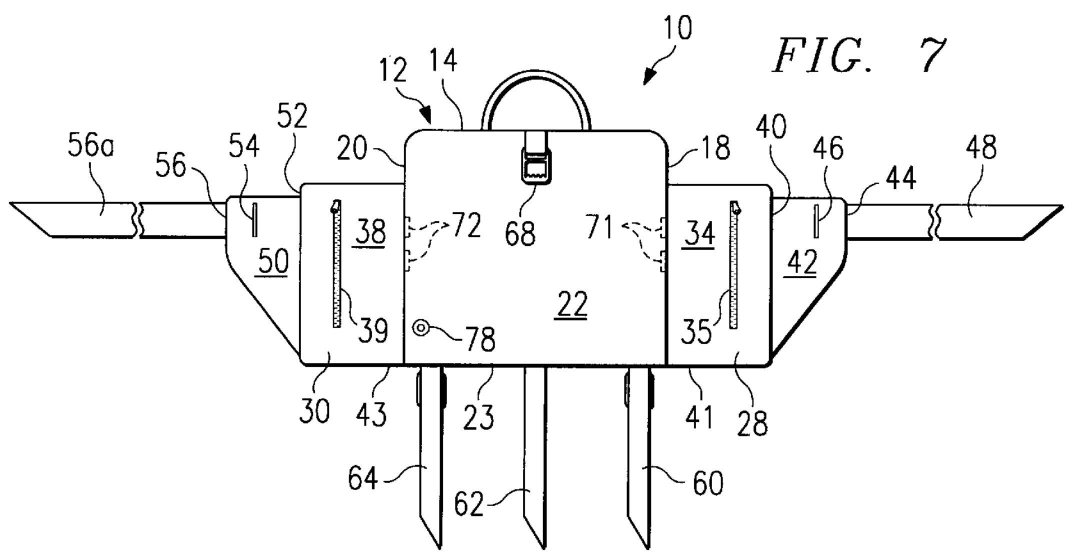
FIG. 7
66
FIG. 7a
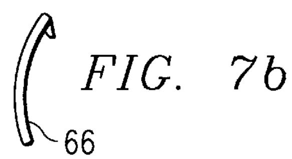
FIG. 7b
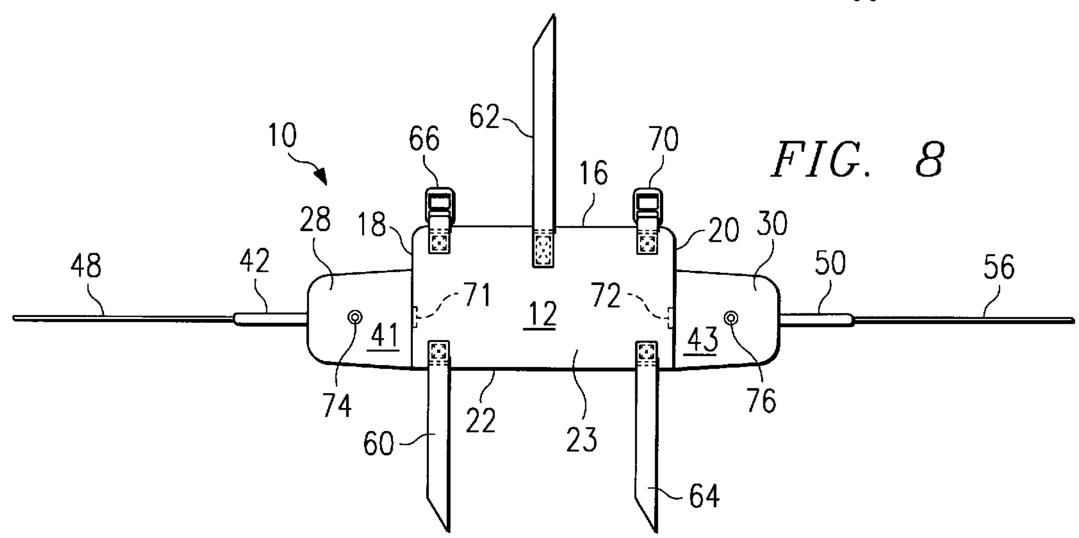
FIG. 8
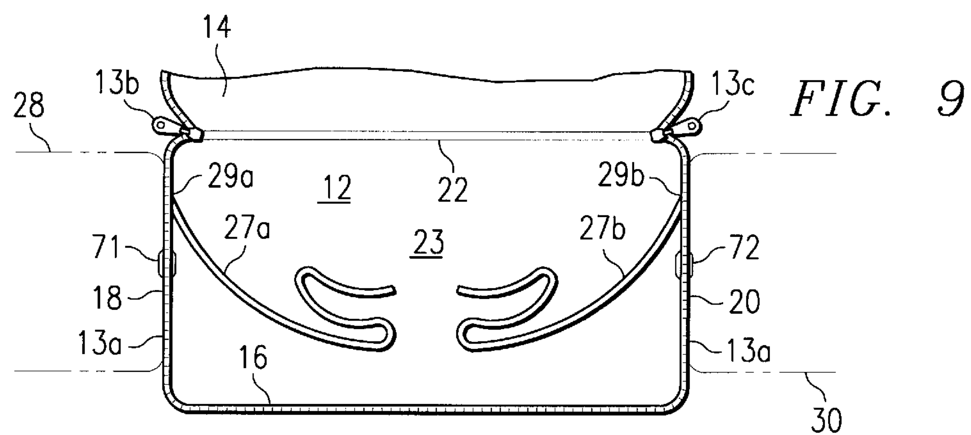
FIG. 9

REMOVABLE BAG FOR MOUNTING OF STEREO SYSTEM ON TWO-WHEELED VEHICLE

TECHNICAL FIELD OF THE INVENTION

The present invention relates to audio systems for vehicles, and more particularly to mounting methods and apparatus for mounting a stereo system to the handlebars of a two-wheeled vehicle.

BACKGROUND OF THE INVENTION

Radios have been installed in automobiles as original equipment for decades. In recent history these radios have become increasingly sophisticated. Originally, car radios received AM only and had only a single speaker. As time when on, automobile manufacturers and after-market equipment suppliers began to produce sound systems for automobiles that had far more than this. A relatively modest car audio system of today includes at least two stereo speakers which are mounted at positions remote from a central, integral unit. This central unit typically receives both AM and FM radio signals includes an amplifier circuit and plays stereo cassettes or CDs. An additional equalizer/amplifier component is common. As the sophistication of these radios has increased, so has their expense, and unfortunately, their attractiveness to thieves. Systems have therefore been developed for the removal of the central units by the automobile owners so that theft may be prevented.

The provision of sophisticated stereo systems for motorcycles has developed apace. Large and better-equipped motorcycles have prices in the tens of thousands of dollars and include complete stereo systems. These are typically incorporated into a faring or are otherwise permanently mounted to the handlebars or gas tank of the motorcycle. The permanent mounting of these often sophisticated stereo systems to the motorcycle makes them attractive targets for thieves. One solution to this problem is to incorporate a stereo system into a helmet of the motorcycle rider. Many motorcycle riders, however, prefer not to wear a helmet and as such this solution does not work for them. A need has therefore arisen for a method and apparatus for removably mounting a stereo audio system to the handlebars of a motorcycle.

SUMMARY OF THE INVENTION

According to the present invention, there is provided an apparatus, preferably a bag, for removably mounting a stereo audio system to a handlebar-steered vehicle, such as a motorcycle, motor scooter or even a bicycle (assuming a self-contained power source in this last instance). The apparatus includes a main compartment sized to receive a main audio unit. At least one orifice is provided to receive the main audio unit therein. The rider may also operate the controls of the main unit through this orifice, which preferably is in the top of the main compartment. Preferably, the main compartment also includes means, such as a pair of straps disposed inside the compartment, to secure the main audio unit therein. The bag further includes left and right speaker compartments adjoining left and right sides of the main compartment, respectively, and having orifices therein for receiving respective ones of a pair of speakers. The speaker compartments are equipped with mesh on its front to permit good transmission of sound therethrough.

The bag has a means for releasably attaching the three compartments to the two-wheeled vehicle's handlebars.

Preferably, a left strap has one end attached through a stabilizing wing to the left speaker compartment and is adaptable to attach to a left handlebar or mirror stem thereon, a right strap has one end attached through a stabilizing wing to a right speaker compartment and is adaptable to attach to a right handlebar or mirror stem thereon, and one or more center straps are attached to the bottom of the main compartment for affixation thereof between the vehicle handlebars. Most preferably, all of these are hook-and-loop or VELCRO™ attachments. Preferably, the near ends of the flexible stabilizing wings or flaps extend the entire length of the respective speaker compartments to which they are joined in order to securely affix the speaker compartment to the handlebars.

The present invention permits the easy installation and removal of a complete automobile-style stereo system to and from the handlebars of a motorcycle or the like. The provision of the left and right speakers in separate compartments from the main unit adapts the bag for receiving conventional car stereo components in a way which prepositions them with respect to the motorcycle rider.

BRIEF DESCRIPTION OF THE DRAWINGS

Further aspects of the invention and their technical advantages will be discerned with reference to the following detailed description, when taken in conjunction with the drawings, in which like characters number like parts and in which:

FIG. 7 is a rear elevational view of a bag according to the invention;

FIGS. 7*a* and 7*b* are details showing a "ladder lock" buckle advantageously used with the invention;

FIG. 8 is a bottom view of the bag shown in FIG. 1;

FIG. 9 is a top detail of the main bag compartment shown in open and empty condition.

DETAILED DESCRIPTION OF THE INVENTION

Figure 1:
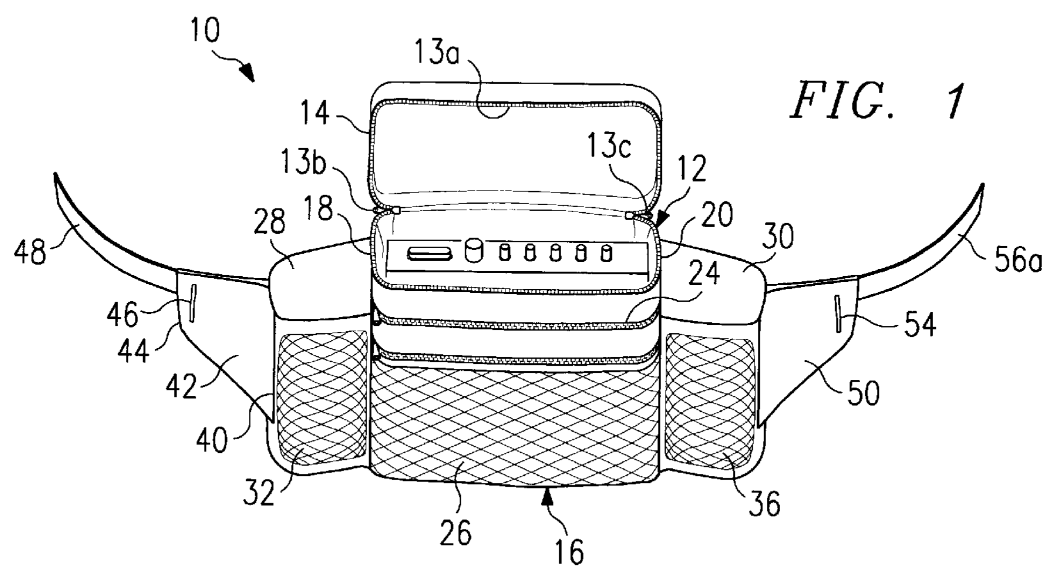
FIG. 1 is an isometric view of a stereo system-containing bag according to the invention.
Figure 2:
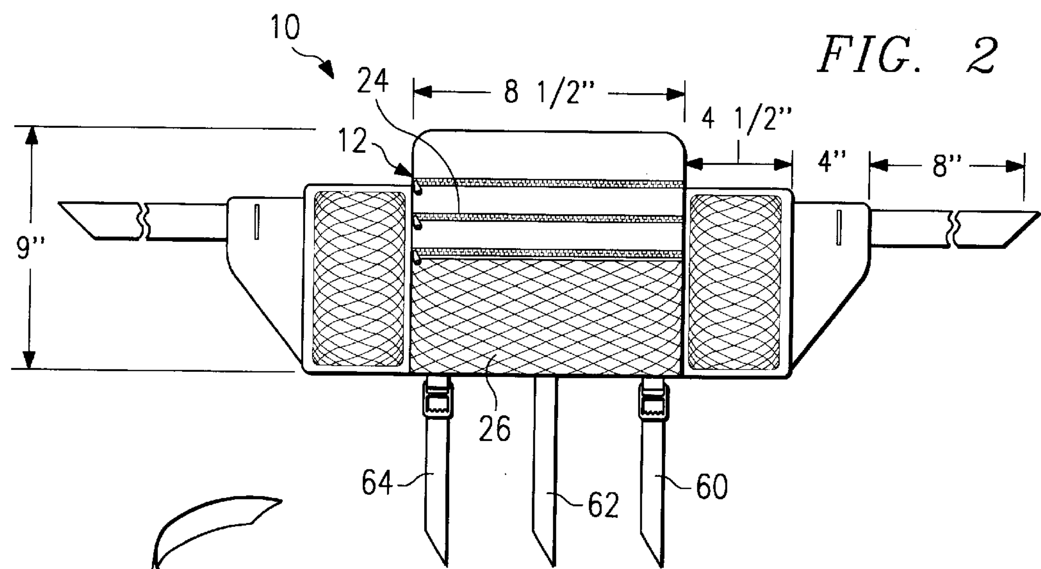
FIG. 2 is an elevational view of the front of the bag as shown in FIG. 1.
Figure 3:
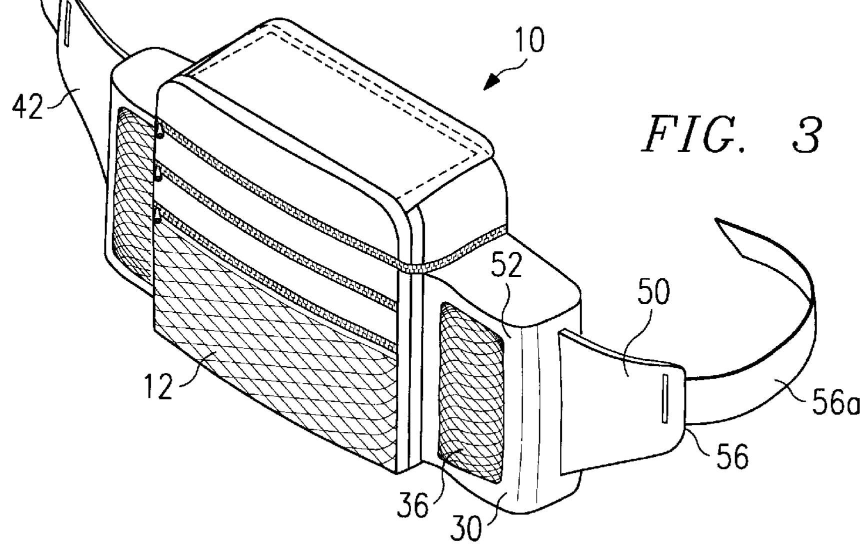
FIG. 3 is a further perspective view of the bag shown in FIG. 1.

Referring to FIGS. 1–3, a bag according to the invention is indicated generally at 10. Most of the structural components of the bag 10 are formed by a relatively tough fabric, such as "polybuc". The bag 10 includes a main compartment 12 that is sized to receive a main audio unit. The main compartment 12 may, for example, be eight to ten inches in width, about nine inches in depth and approximately four and a half inches in thickness front-to-back. Such a size will be able to fit at least 90% of all car radios made. One of the advantages of the invention is that typical integral automobile dashboard receiver/amplifier/CD or receiver/amplifier/ cassette tape player units may be fit into the main compartment 12. Therefore, specialized audio equipment does not have to be manufactured for use with the bag, but rather standard audio equipment widely manufactured for cars and trucks may be used in this application. As illustrated, more than one such audio unit or component thereof may be placed inside of the main compartment 12. For example, a combination radio receiver/CD player may be inserted in the compartment 12 together with an amplifier/equalizer unit. In alternative uses, the compartment 12 may be used to mount a citizen's band radio (CB) or other electronic equipment.

The main compartment 12 has a top flap 14 with a zippered closure to protect the main audio unit(s) from the weather. The top zipper 13*a* preferably has two gliders 13*b* and 13*c* for ease in opening and closing (see FIG. 9). It is preferred that the access to the main compartment 12 be from the top so that the motorcycle rider can easily change stations, insert a new CD, cassette or the like. In alternative embodiments (not shown) the top flap may be apertured to permit rider access, but still retain the unit, and additionally there may be a storm cover to fit over this aperture in inclement weather. The main compartment 12 has a front panel 16, left and right side panels 18 and 20, a rear panel 22 (FIG. 7) and a bottom panel 23 (FIG. 8). These panels may be formed by folding and stitching of polybuc material or other flexible sheet-like material to create a rectangular compartment. The main compartment 12 also may have a zippered front pocket 24 and an exterior mesh pocket 26, both for the storage of incidentals.

Cushioning or padding can be added to the interior of the center compartment 12 as a stitched-in liner (not shown). Alternatively, padded inserts custom-manufactured for each of the inserted audio components may be provided. This padding may be provided to absorb shocks from the road. The type and thickness of the padding should not be so much as to provide significant heat insulation, however, as the electronics contained in the main compartment 12 have to be operated within certain temperature limits.

In FIG. 9, one possible embodiment is shown in which a securing means, such as a pair of hook-and-loop straps 27*a* and 27*b*, are used to secure the main audio unit (not shown) into the main compartment. Respective ends 29*a* and 29*b* of the straps 27*a* and 27*b* are attached as by stitching to respective compartment sidewalls 18 and 20 at points relatively near the rear plane of the bag 10. This reduces any cantilevering vibrational mode between the attachment points and the plane including rear plane 22, which is proximate to the points of securement to the motorcycle. The straps 27*a* and 27*b* are long enough to secure the largest component or group of components, which can fit into the main compartment 12.

The bag 10 also includes a left speaker compartment 28 and a right speaker compartment 30. The left speaker compartment 28 is formed on the left sidewall or panel 18 of the main compartment 12, and is sized to fit up to a four and a quarter inch square or four inch by six inch car stereo speaker. A front panel 32 of the left speaker compartment 28 is formed from an open mesh material so as to allow the relatively unaltered transmission of sound from the installed speaker in the direction of the motorcycle rider. A rear panel 34 (FIG. 7) of the left speaker compartment 28 is zippered so as to allow the installation of a car stereo speaker therein.

The right speaker compartment 30 is formed in mirror image to the left speaker compartment 28. Right speaker compartment 30 is formed on the right sidewall or panel 20 of the main compartment 12; as is the case for left speaker compartment 28, various panels and subcomponents thereof may either be stitched to the right sidewall 20 or be formed as extensions of the material making up the central compartment 12. In order to better maintain its desired form, however, it is preferred that the bottom, outer side and rear of each side compartment 28 and 30 be constructed of an integral fabric panel that is stitched to a mesh front, a top and a respective sidewall of main compartment 12, and that the main compartment 12 be stitched together from separate substantially rectangular pieces for its top 14, sidewalls 18 and 20, front 16, back 22 and bottom 23.

A front panel 36 of the right speaker compartment is formed of an open mesh material so as to allow the transmission of sound from the right speaker to the motorcycle rider. A rear panel 38 (FIG. 7) is zippered with a zipper 39 to permit the installation of a right speaker in the compartment 30.

It is preferred that the left speaker compartment 28 and the right speaker compartment 30 have bottom panels 41 and 43 (FIG. 8) in a common plane with the bottom panel 23 of central compartment 12.

Figure 4:
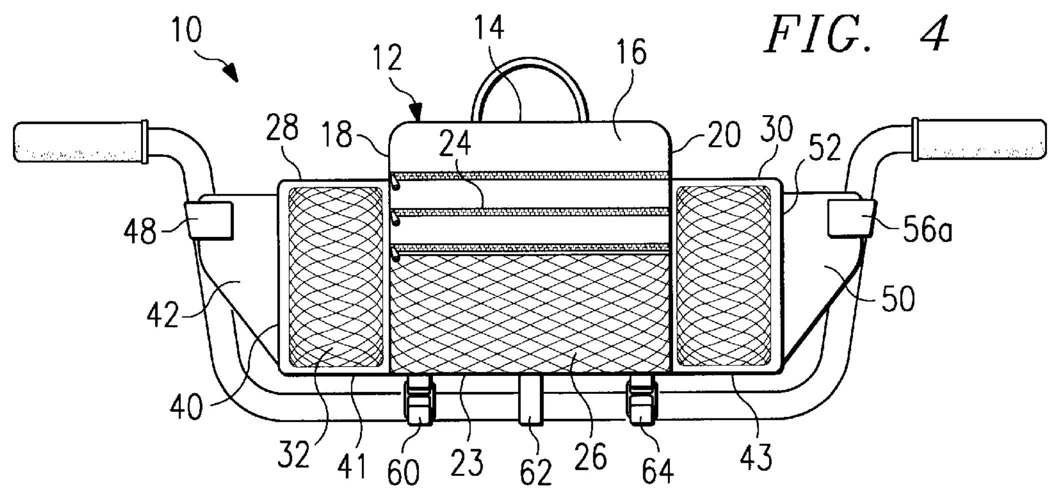
FIG. 4 is an elevational view of the bag shown in FIG. 1, showing its method of attachment to a pair of motorcycle handlebars.
Figure 5:
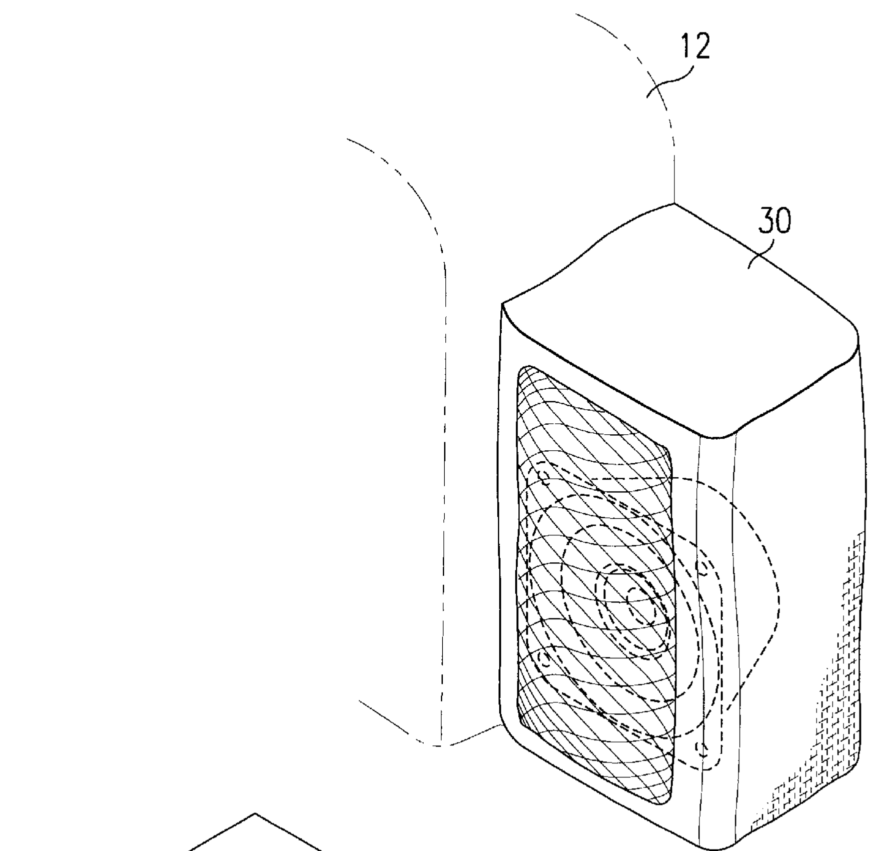
FIG. 5 is a detail showing a right side compartment or pocket, a speaker having been inserted therein shown in phantom.
Figure 6:
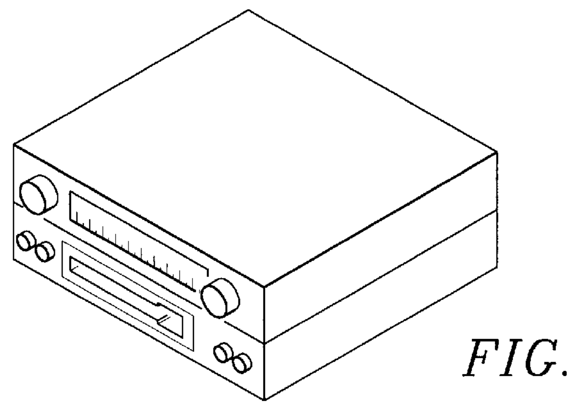
FIG. 6 is an isometric view of an exemplary automobile stereo system which may be used in conjunction with the invention.

Mounted along a vertical center line of a left panel 40 of the left speaker compartment 28 is an attachment wing 42 which is formed of leather or other comparatively strong material. The height of the near end of the leather wing 42 is a substantial portion of the height of the sidewall 40, and preferably is secured to the sidewall 40 along most of its height. Toward its outer margin or far end 44, the wing 42 has an opening 46 sized to allow the passage therethrough of a hook and loop or "VELCRO" securing strap 48 (see FIG. 4). In similar fashion, a right attachment wing 50 is stitched preferably to a vertical center line of a right panel 52 of the right speaker compartment 30. An opening 54 is provided near a far end 56 of the wing 50 to permit the passage therethrough of a hook and loop or "VELCRO" securing strap 56 (FIG. 4). The wings 42 and 50 are sized so that the bag compartments and the wings cumulatively extend completely between any of almost any type of motorcycle handlebars, including but not limited to buckhorn, pull back, drag bar, flat track, ape hanger and cruiser types. The side straps 48 and 56*a* are either wrapped around the handlebars themselves or are secured to mirror stems thereon (not shown), which typically are mounted to the handlebars at positions near their ends. The securement of the wings 42 and 50 along substantial lengths of the heights of the outer sidewalls of the respective speaker compartments 28 and 30 allows the bag 10 to be secured in a more rigid fashion, to better resist buffeting by the wind, and to limit torsional movement of the bag compartments relative to the handlebars.

FIG. 4 is an elevational illustration of the bag 10 as secured to the handlebars of a motorcycle. Hook and loop fastening straps are preferred, although other style fasteners could be employed. A bottom panel 23 of the main compartment 12 is fitted with preferably three center securing straps 60, 62 and 64, which can be of the hook and loop or quick connect variety. The straps 60, 62 and 64 are preferably used in conjunction with "ladder locks" 66, 68 and 70 (see also FIG. 8), one of which is shown in detail in FIGS. 7*a* and 7*b*. The other securing straps used in this invention may also be of the hook and loop variety.

As best seen in FIG. 8, a grommeted hole schematically shown at 71 is formed in the left sidewall 18 at a position which is interior to the left speaker pocket 28. Similarly, a grommeted hole is shown schematically at 72 which is positioned on the right sidewall 20 of the main compartment 12, and communicates the main compartment 12 with the right speaker pocket 30. A further grommeted hole 74 is formed in the bottom panel 41 of the left speaker pocket 28. The hole 74 is matched with a hole 76 formed in the bottom panel 43 of the right speaker compartment 30.

As installed, a left speaker wire is run from the main audio unit (not shown) secured within the main compartment 12 to the left speaker (not shown) housed within the left speaker pocket 28. Similarly, a right speaker wire (not shown) is connected between the main audio unit and a right speaker (not shown) housed within the right speaker pocket 30. The left and right speaker wires are fed through holes 71 and 72, respectively. Advantageously, this wiring is performed within the interior of the bag, so as not to be exposed to the elements. The power leads to the main audio unit also use grommeted holes 71 and 72. The "hot" lead is fed through, e.g., hole 71 and bottom hole 74 and is connected to the positive terminal of a 12-volt motorcycle battery (not shown). The ground lead would then be fed through interior hole 72 and bottom exit hole 76. Of course, the hot terminal and ground leads can easily be reversed.

As best shown in FIG. 7, a further hole 78 in the rear panel 22 of the main compartment 12 is provided for a radio antenna, which preferably is of the all-weather rubber-coated variety. The antenna (not shown) is secured to hole 78 so as to protrude upwardly therefrom to get good radio reception. Alternatively, an antenna loop may be sewn into one or more of the bag compartments in replacement of an upstanding aerial, or even arranged around the motorcycle license plate.

While an embodiment of the invention has been shown that is adapted to mounting to the handlebars (or even mirror stems) on a motorcycle, other embodiments may be fashioned for use with other vehicles. A similar bag could be fashioned for a bicycle. The stereo bag of the invention has application anywhere where a handlebar-steered vehicle is not provided with a custom stereo unit or other electronic apparatus (such as a CB radio), but the rider or driver wants this convenience.

In summary, apparatus for releasably attaching a vehicular stereo system to a handlebar-steered vehicle has been illustrated and described. While a preferred embodiment of the invention has been described and illustrated in the foregoing detailed description and in the attached drawings, the invention is not limited thereto but only by the scope and spirit of the appended claims.

What is claimed is:

1. A bag for removably mounting any one of a plurality of commercially available stereo audio systems preselected by a rider of a handlebar-steered vehicle to handlebars of the handlebar-steered vehicle, comprising:

- a main compartment formed of a flexible material and sized to receive at least a preselected one of a plurality of main audio units therein, a closeable orifice in said main compartment for receiving the preselected main audio unit, said main compartment having left and right sidewalls;
- a left speaker compartment formed of a flexible material and adjoining said left sidewall of said main compartment, a closeable orifice of said left speaker compartment sized to receive a preselected one of a plurality of speakers, said left speaker compartment sized to house said preselected speaker, a front, vertically disposed panel of said left speaker compartment formed of a material which readily permits the transmission of sound therethrough;
- a flexible right speaker compartment formed of a flexible material and adjoining said right sidewall of said main compartment, a closeable orifice of said right speaker compartment sized to receive a preselected one of a plurality of speakers, said right speaker compartment sized to house said preselected speaker, a front, vertically disposed panel of said right speaker compartment formed of a material which readily permits the transmission of sound therethrough; and
- means for releasably attaching said main compartment, said left speaker compartment and said right speaker compartment to left and right handlebars of the two-wheeled vehicle in such a manner as to permit the quick removal of the bag and the components housed therein as a single unit.

2. The of claim 1, wherein said means for releasably attaching said compartments to left and right handlebars of said vehicle include a left flexible strap having a first end affixed to a left side of the bag and a free end for either wrapping around said left handlebar or attaching to a mirror stem thereon, and a right flexible strap having a first end affixed to a right side of the bag and a free end for either wrapping around said right handlebar or attaching to a mirror stem thereon.

3. The bag of claim 1, wherein said main compartment has a top panel, said orifice formed in said top panel.

4. The bag of claim 1, and further comprising a port formed in the left sidewall of the main compartment and opening onto an interior of the left speaker compartment for receiving therethrough one or more speaker wires for delivering an audio signal from said main audio unit to the speaker housed in the left speaker compartment, a port formed in the right sidewall of the main compartment and opening onto an interior of the right speaker compartment for receiving therethrough one or more speaker wires for delivering an audio signal from said main audio unit to the speaker housed in the right speaker compartment.

5. The bag of claim 1, wherein said main compartment has a rear panel, an antenna orifice formed in said rear panel for mounting an external antenna therethrough, said antenna being conductively connected to said main audio unit.

6. A bag for removably mounting any of a purality of commercially available audio stereo systems preselected by a rider of a two-wheeled vehicle to right and left handlebars of the two-wheeled vehicle, comprising:

- a main compartment with an orifice sized to receive at least a preselected one of a plurality of main audio units, said main compartment having a left sidewall, a right sidewall and a top panel, an orifice formed in said top panel for permitting access to controls on the preselected main unit by the rider of the vehicle, means for affixing said main compartment to the handlebars of said two-wheeled vehicle;
- a left speaker compartment formed to adjoin said left sidewall of said main compartment, said left speaker compartment having a left sidewall, an orifice in said left speaker compartment sized to receive a preselected one of a plurality of speakers;
- a left attachment wing having an inboard end adjoined to said left sidewall of said left speaker compartment, said left sidewall of said left speaker compartment having a height, said inboard end of said left wing adjoining said left sidewall of said left speaker compartment along a substantial portion of said height, an outboard end of said left wing including quickly releasable means for attaching said outboard end to a left handlebar of said two-wheeled vehicle;

a right speaker compartment adjoining said right sidewall of said main compartment, said right speaker compartment having an orifice for receiving a preselected one of a plurality of speakers and a right sidewall, said right sidewall of said right speaker compartment having a height;

a right attachment wing having an inboard end attached along a substantial portion of the height of said right sidewall of the right speaker compartment, an outboard end of said right wing having quickly releasable means for affixing the last said outboard end to a right handlebar of the two-wheeled vehicle; and a cumulative length of said left wing, said left speaker compartment, said main compartment, said right speaker compartment and said right wing being sized to substantially linearly extend between the points of attachment to the left and right handlebars of said two-wheeled vehicle.

7. The bag of claim 6, and further comprising a left speaker wire orifice between said left speaker compartment and said main compartment formed in said left sidewall of said main compartment, said left speaker wire orifice located interiorly of the sidewalls of said left speaker compartment which adjoin said main compartment, a right speaker wire orifice formed between said right speaker compartment and said main compartment in said right sidewall of said main compartment, said right speaker wire orifice formed interiorly of sidewalls of said right speaker compartment which adjoin said right sidewall of said main compartment, said speaker wire orifices adapted to receive speaker wires therethrough for the respective connection of the speakers housed in the left and right speaker compartments to a main audio unit housed in the main compartment.

8. The bag of claim 6, wherein said main compartment has a rear panel, an orifice formed in said rear panel for receiving an external radio antenna therethrough.

9. The bag of claim 7, wherein said left and right speaker compartments each have a bottom panel, an orifice formed in said bottom panel for the receipt of power conductors from a power supply on the two-wheeled vehicle, said power conductors connecting to power supply terminals of said main audio unit.

10. The bag of claim 6, wherein said left and right wings are formed of flexible material.

* * * * *